Nov. 9, 1926.  
W. C. SCHULZ  
1,606,265  
GRAIN CAR DOOR STRUCTURE  
Filed June 12, 1924    2 Sheets-Sheet 1
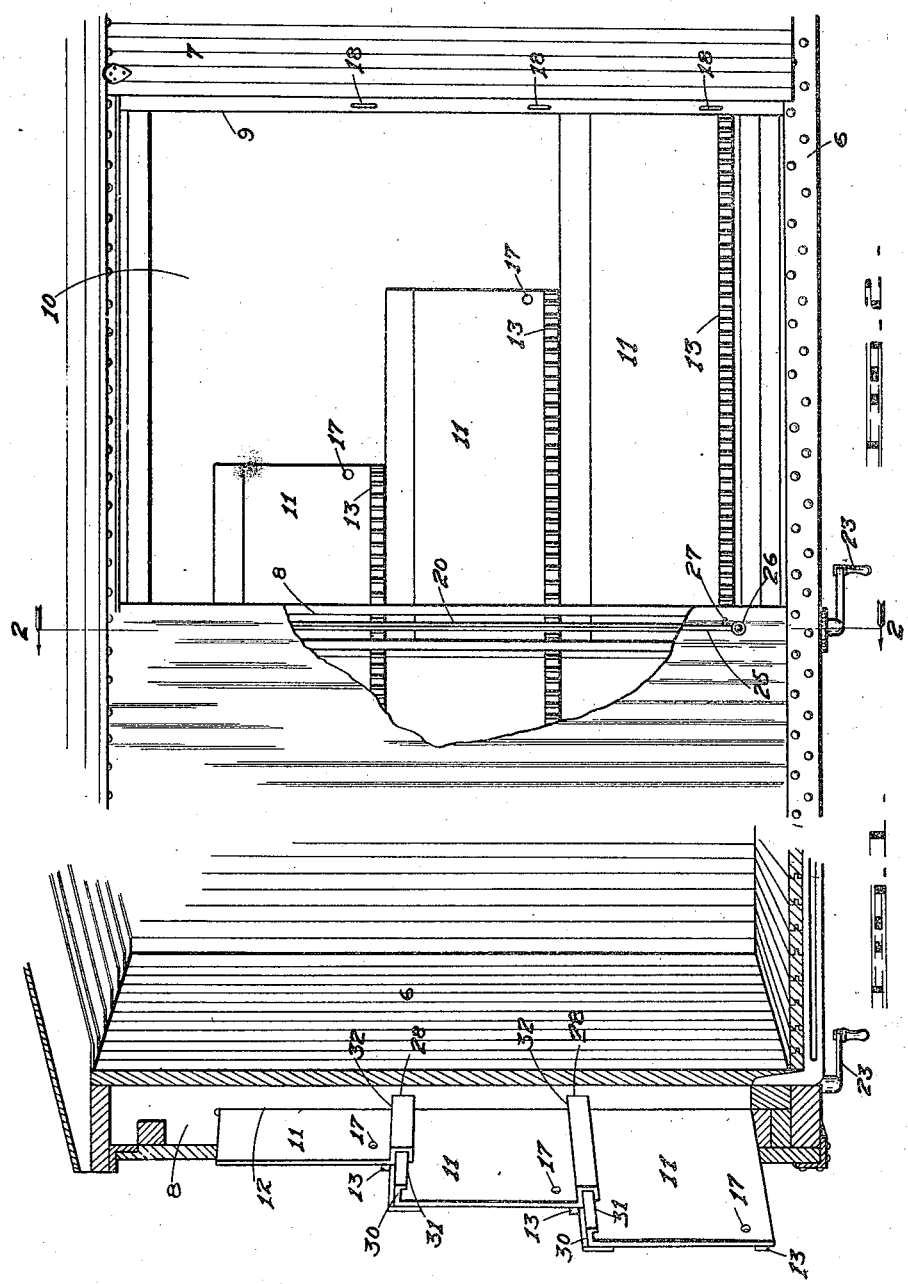
INVENTOR  
WILLIAM CHARLES SCHULZ  
BY Harold C. Shipman  
ATTORNEY

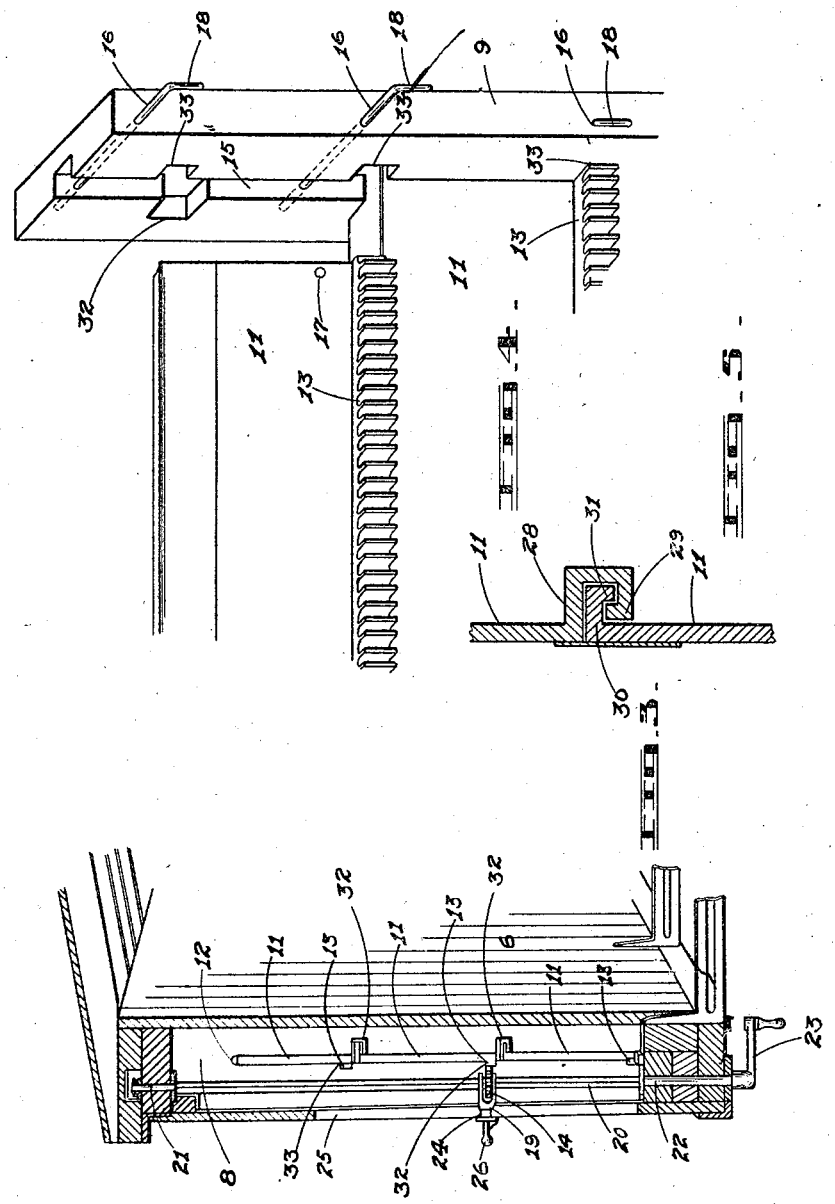

Patented Nov. 9, 1926.

1,606,265

UNITED STATES PATENT OFFICE.

WILLIAM CARL SCHULZ, OF BEISEKER, ALBERTA, CANADA.

GRAIN-CAR-DOOR STRUCTURE.

Application filed June 12, 1924. Serial No. 719,541.

This invention has relation to certain new and useful improvements in a grain car door structure and has for its primary object the provision of a sectional grain car door formed in such a manner as to permit opening and closing of the sections separately.

The invention has for another object the provision of a grain car door structure which will include sections slidably mounted on one another and adapted to be opened or closed independently by a common operating means.

The invention has for a further object the provision of a grain car door composed of sections having independent racks so that either section may be operated by the pinion controlled from the exterior of the car to open and close the car door sections separately during loading and unloading of the car.

A still further object of the invention resides in the provision of a grain car door in which the slidable sections may have their adjacent edges interlocked to provide for close fitting of the door sections upon one another and prevent separation of the door sections and passage of the grain therebetween.

The invention has for a still further object the provision of a sectional grain car door which will be composed of the minimum number of parts of comparatively simple and inexpensive construction and arrangement so that the sections may be readily opened and closed, as desired.

A still further object resides in the provision of a sectional slidable grain car door which may be incorporated in the grain car structures now in general use, without material alterations in the car structure or any appreciable increase in cost.

With the foregoing and other objects in view as will appear as the description proceeds, the invention consists in the novel construction, combination and arrangement of cooperating elements as hereinafter more specifically set forth, claimed and shown in the accompanying drawings and in which:

Fig. 1 is a perspective view partly in section and disclosing the sectional door structure and the mounting thereof.

Fig. 2 is an elevation with the sectional door partially opened and the outer door in its open position, parts of the car and outer door being broken away.

Fig. 3 is a view similar to Fig. 1, taken through a different portion of the car side, this view being substantially on the plane of line 3—3 of Fig. 2 and looking in the direction indicated by the arrows.

Fig. 4 is an enlarged perspective view of a portion of the sectional door and the side frame member for receiving one side edge of the door and accommodating the ends of the door sections.

Fig. 5 is a detail sectional view through portions of adjacent sections of the door, showing the manner of interlocking the edges of the door sections.

Referring more in detail to the drawings, in which similar symbols of reference designate corresponding parts throughout the several views, 6 indicates a portion of the grain car having the usual outer sliding door member 7. Side door frame members 8 and 9 are located at the opposite sides of the door opening 10, as shown clearly in Fig. 2.

The sectional grain door is composed of a plurality of transverse sections 11 adapted to slide through the slot 12 provided therefor in the side door frame member 8. The door sections 11 are positioned one upon another and are each provided with a rack 13 for engagement by the operating pinion 14, as shown in Fig. 3. The racks 13 are secured upon the outer face of the door sections 11 and along the lower edges thereof, as shown clearly in Figs. 2 and 4. A receiving groove 15 is provided in one face of the side door frame member 9 to receive one end of the door sections 11 when the latter are in closed position, as indicated in Fig. 4. Locking pins 16 are removably engaged in the side door frame member 9, one pin being provided for each door section 11. Each door section 11 has an opening 17 extended therethrough near its lower corner to receive the locking pin 16 for this section when the latter is closed. The locking pins 16 have their outer ends 18 turned at an angle so as to rest against one face of the side door frame member 9, inwardly of the ordinary or outer sliding car door 7, when the locking pins 16 are in their innermost or operative position.

The pinion 14 is mounted in a bracket 19 slidable on a squared vertical operating shaft 20, bracket 19 being loose on the shaft 20, while the pinion 14 is adapted to rotate with the shaft 20. The operating shaft 20 is extended vertically in the hollow wall of the car between the inner and outer wall members, as shown in Figs. 2 and 3. The opposite ends 21 and 22 of the operating or controlling shaft 20 are rounded and rotatably mounted in upper and lower wall members of the car structure, as shown in Fig. 3.

The operating handle 23 is secured to the lower end of the shaft 20 beneath the side of the car, as shown in Figs. 1, 2 and 3 for operating the shaft 20. A stem 24 projects from the bracket 19 and extends through the elongated vertical slot 25 in the outer wall member of the car to provide for vertical movement of the bracket 19 to raise and lower the pinion 14 on the shaft 20.

A controlling handle 26 is carried on the stem 24, outwardly of the side of the car, so that the bracket 19 may be readily adjusted on the operating shaft 20. The slot 25 may also have notches 27 along one side to receive the shank 24 when the pinion 14 reaches a position opposite one of the racks 13. This will be readily understood by referring to Fig. 2. The handle 26 may have a vertical hinge connection with the shank 24 so that when not in use, it will be hinged flat with the side of the car and thus eliminate the possibility of being broken off.

Each door section 11 has a channel iron or closure member 28 formed therewith and extended along one longitudinal edge and provided at its open side with an inwardly directed flange 29. The interlocking closure strip 30 is formed on the adjacent longitudinal edge of the door section 11, below the first mentioned section and the closure strip 30 has an angularly extended flange 31 provided along its upper longitudinal edge for interlocking engagement with the flange 29 of the channel iron or closure member 28. This is shown in detail in Fig. 5. It will be seen by referring to Fig. 5 that a secure interlocking is provided between the adjacent longitudinal edges of the door sections 11 to prevent grain from passing between the sections and to prevent separation of the sections while sliding longitudinally upon one another.

The closure members 28 and 30 extend rearwardly from the inner faces of the door sections 11 and notches 32 are provided along the rear edges of the slots 12 and 15 in the door frame members 8 and 9, respectively, to accommodate the closure members 28 and 30. Notches 33 are also provided along the forward or outer sides of the slots 12 and 15 to accommodate the racks 13. The arrangement of the notches 32 and 33 may be understood by referring to Figs. 1, 3 and 4.

It is believed the construction and operation of the sectional grain door may now be understood from reference to the foregoing paragraphs taken in connection with the accompanying drawings without further detailed description. It may be briefly stated, however, that the outer slidable door 7 may be opened and closed independently of the sectional grain door and may be mounted in the usual manner and provided with a conventional form of locking means, not shown. The sectional grain door may be locked in closed position by sections through the medium of the locking pins 16, as previously stated. Any one of the sections may be moved to open or closed position by proper adjustment of the pinion 14 and rotation of the shaft 20 by the handle 23. It is therefore apparent that the door sections 11 may be moved to any position desired independently of one another, for loading and unloading the grain car. Furthermore, the door sections 11 will be prevented from separating but they may freely slide upon one another.

While the preferred embodiment of the invention has been disclosed, it is to be understood that minor changes in the details of construction and arrangement of parts may be resorted to within the scope of what is claimed without departing from the spirit of the invention.

What I claim as new is:

1. A grain car door comprising side frame members; transverse door sections slidably mounted upon one another; interlocking closure members formed on the edges of said door sections; a rack carried by each door section; each of said side door frame members being provided with openings to receive the door sections; a main operating shaft; operating means carried by said main operating shaft; and a pinion locked with said shaft and adjustable longitudinally thereon for engagement with any one of the racks to operate the door sections on which the rack is carried.

2. A sectional grain car door comprising the combination with a slotted door frame member and a recessed door frame member; of door sections slidably mounted upon one another and adapted to pass through the first mentioned side door frame member; said door sections being adapted to have one end received in the second mentioned door frame member; adjustable operating means for moving the door frame sections separately to open or closed position; controlling means for the said adjustable operating means; and means for locking the door sections in closed position.

WILLIAM CARL SCHULZ.